United States Patent [19]

Rudolph et al.

[11] Patent Number: 5,969,429

[45] Date of Patent: Oct. 19, 1999

[54] BREATHING APPARATUS HAVING ELECTRICAL POWER SUPPLY ARRANGEMENT WITH TURBINE-GENERATOR ASSEMBLY

[75] Inventors: Joseph Rudolph, Panama City Beach; Robert Hughes; Kenneth Price, both of Lynn Haven, all of Fla.

[73] Assignee: The United States of America as represented by the Secretary of the Navy, Washington, D.C.

[21] Appl. No.: 08/919,178

[22] Filed: Aug. 15, 1997

[51] Int. Cl.⁶ ................................ F03B 13/00; H02P 9/04
[52] U.S. Cl. .......................... 290/54; 290/1 A; 290/1 R; 290/43; 290/52; 290/1 B; 128/201.19
[58] Field of Search .................................... 290/1 A, 112, 290/43, 52, 54; 128/204.19, 204.2, 204.24

[56] References Cited

U.S. PATENT DOCUMENTS

| 4,186,735 | 2/1980 | Henneman et al. | 128/201 |
|---|---|---|---|
| 4,511,806 | 4/1985 | May | 290/43 |
| 4,823,013 | 4/1989 | Hartdorn | 128/202 |
| 5,421,326 | 6/1995 | Rankin et al. | 128/201 |
| 5,511,542 | 4/1996 | Hall | 128/201 |
| 5,689,968 | 11/1997 | Frustaci et al. | 62/259 |
| 5,697,361 | 12/1997 | Smith | 128/204 |

*Primary Examiner*—Elvin G. Enad
*Attorney, Agent, or Firm*—Harvey A. Gilbert; Donald G. Peck

[57] ABSTRACT

An electrical power supply arrangement incorporates a turbine-generator assembly providing a self-contained non-battery electrical power source for supplying power to a breathing apparatus. The turbine-generator assembly is interposed in an air hose extending between first and second stage pressure regulators respectively connected to a pressurized air cylinder and to a cooling device of the breathing apparatus. The assembly includes an air turbine and an electrical generator disposed and coupled in tandem relationship to one another and enclosed in an elongated hollow housing. Pressurized air introduced into the turbine end of the housing expands across turbine blades and rotatably drives a central shaft of the turbine which, in turn, rotates a central rotor of the generator causing generation of electrical power in a stationary stator of the generator which surrounds the rotor. The electrical power can be accessed at a terminal block attached to the generator end of the housing for supplying power to operate the cooling device of the breathing apparatus.

22 Claims, 1 Drawing Sheet

BREATHING APPARATUS HAVING ELECTRICAL POWER SUPPLY ARRANGEMENT WITH TURBINE-GENERATOR ASSEMBLY

BACKGROUND OF THE INVENTION

1. Field of the Invention

The present invention generally relates to firefighting and damage control activities and, more particularly, is concerned with an electrical power supply arrangement incorporating an air pressure driven turbine-generator assembly which provides a self-contained non-battery electrical power source for supplying electrical power to a breathing apparatus.

2. Description of the Prior Art

Successful evolution of firefighting and damage control techniques and devices are paramount to the safety and survivability of naval vessels. In order to facilitate firefighting and damage control activities, active breathing protection is often required. Active breathing protection is provided, for instance, through the use of a self-contained breathing apparatus (SCBA). Because of the high ambient temperatures associated with shipboard firefighting, the SCBA often provides breathing air at excessive temperatures which must be reduced before the breathing air is inhaled by the firefighter.

One method of cooling the breathing air as provided heretofore in the SCBA is by the use of a cooling device containing thermoelectric chips (TEC) which requires the availability of an electrical power source for its operation. Electrical power is needed to drive the TEC of the cooling device to cause transfer of heat from one region of the cooling device through which the breathing air is routed to another region. However, the availability of an electrical power source poses a major problem onboard naval vessels. Use of batteries is not desired due to the associated logistics concerns.

Consequently, for the above reason, a need exists for a small non-battery electrical power source to use in breathing apparatuses, particularly for onboard naval vessels but also for other firefighting applications as well.

SUMMARY OF THE INVENTION

The present invention provides an electrical power supply arrangement which incorporates an air pressure driven turbine-generator assembly designed to satisfy the aforementioned need. The air pressure driven turbine-generator provides a self-contained non-battery electrical power source for supplying needed electrical power to a breathing apparatus, for instance to a cooling device employed in an open-circuit self-contained breathing apparatus as typically employed by personnel involved in firefighting and damage control activities, especially onboard naval vessels.

Accordingly, the present invention is directed to an electrical power supply arrangement for a breathing apparatus. The electrical power supply arrangement comprises: (a) first means for supplying a flow of pressurized air at a first pressure higher than atmospheric pressure; (b) second means for supplying the flow of pressurized air at atmospheric pressure to an electrically-operated cooling device of the breathing apparatus; (c) an air flow transmission line extending between and interconnecting the first supplying means and the second supplying means for routing the flow of pressurized air from the first supplying means to the second supplying means; and (d) a turbine-generator assembly interposed in the air flow transmission line for receiving the flow of pressurized air at the first pressure from the first supplying means and discharging the flow of pressurized air at a second pressure lower than the first pressure but higher than atmospheric pressure to the second supplying means. The turbine-generator assembly, in response to expansion of the flow of pressurized air received from the first supplying means that reduces the pressurized air from the first pressure to the second pressure, is operable to produce a supply of electrical power for operating the cooling device of the breathing apparatus.

The first supplying means is a first stage pressure regulator for receiving the flow of pressurized air from a source of pressurized air higher the first pressure and for reducing the pressure of the pressurized air to the first pressure. The second supplying means is a second stage pressure regulator for receiving the flow of pressurized air at the second pressure from the turbine-generator assembly and for reducing the pressure of the pressurized air to substantially atmospheric pressure.

The turbine-generator assembly includes an air turbine for receiving the flow of air and, in response thereto, producing mechanical rotary motion, and an electrical generator for receiving the mechanical rotary motion and, in response thereto, producing a supply of electrical power for operating the cooling device of the breathing apparatus. The air turbine and electrical generator are disposed and coupled in tandem relationship to one another.

The turbine-generator assembly further includes an elongated hollow housing enclosing and rotatably mounting the air turbine and electrical generator. The electrical terminal block is attached to the housing and provides a means for accessing electrical power generated by the turbine-generator assembly. The air turbine of the turbine-generator assembly has a rotatable central shaft and a plurality of blades attached to and extending radially outwardly from the central shaft. The central shaft is rotatable upon receiving the flow of pressurized air. The electrical generator of the turbine-generator assembly has a rotatable central rotor and a stator surrounding the central rotor. The central rotor is coupled to and rotatably driven by the central shaft of the air turbine for generating electrical power in the stator of the electrical generator. Expansion of the flow of pressurized air from the first pressure to the second pressure across the blades causes rotation of the central shaft of the air turbine and, in turn, rotation of the central rotor of the electrical generator. This rotation of the central rotor results in the generation of electrical power in the stator of the electrical generator.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference *will be made to the attached drawings in which.

DETAILED DESCRIPTION OF THE INVENTION

Figure 1:
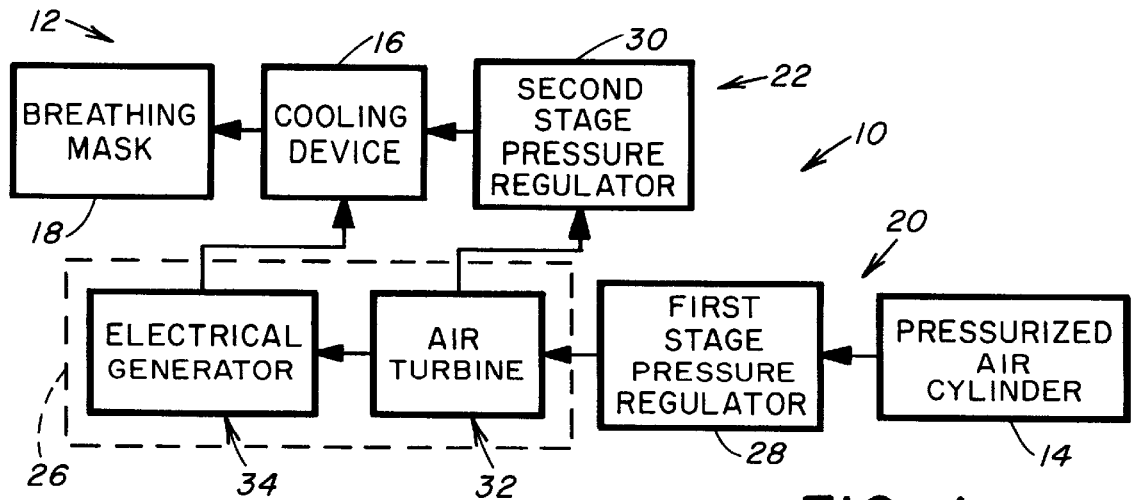
FIG. 1 is a general diagram of a breathing apparatus including an electrical power supply arrangement of the present invention incorporating an air pressure driven turbine-generator assembly as a self-contained non-battery electrical power source for the breathing apparatus.
Figure 2:
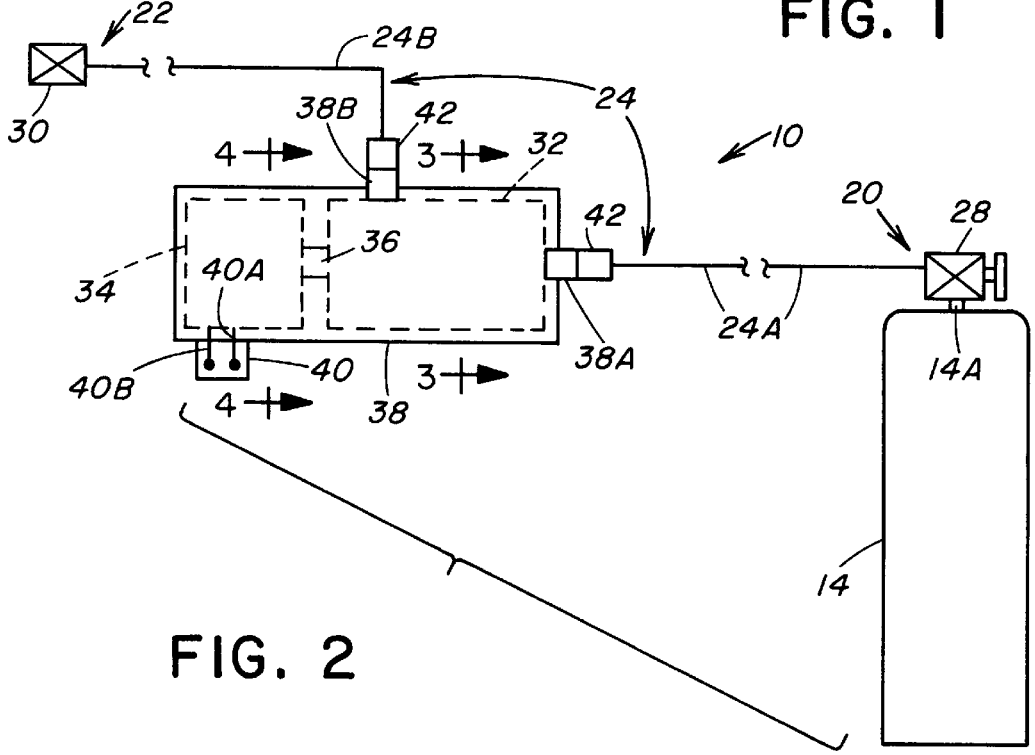
FIG. 2 is a general diagram of the electrical power supply arrangement of the present invention.
Figure 4:
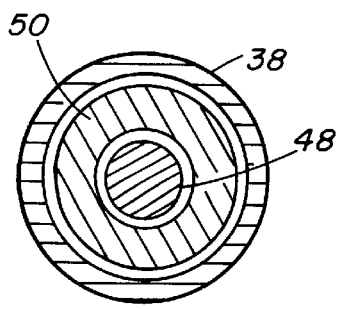
FIG. 4 is an enlarged cross-sectional view of the electrical generator component of the turbine-generator assembly of the electrical power supply arrangement taken along line 4—4 of FIG. 2.
Figure 3:
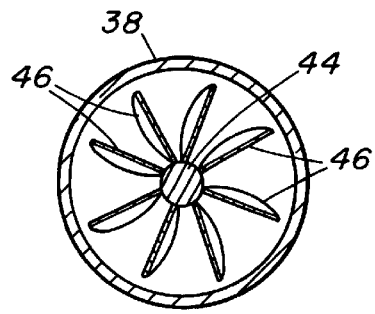
FIG. 3 is an enlarged cross-sectional view of the air turbine component of the turbine-generator assembly of the electrical power supply arrangement taken along line 3—3 of FIG. 2.

Referring to the drawings and more particularly to FIGS. 1 and 2, there is illustrated in diagrammatic form an electrical power supply arrangement, generally designated 10, of the present invention, employed with a breathing apparatus 12 commonly referred to as an open-circuit self-contained breathing apparatus (SCBA) as is typically used onboard naval vessels during firefighting and damage control activities. As conventionally provided heretofore, the breathing apparatus 12 has included a pressurized air supply in the form of a pressurized air cylinder 14, a cooling device 16, a breathing mask 18, and a source electrical power, such as conventional batteries, associated with the cooling device 16. The cylinder 14 is of any suitable type. The air in the cylinder 14 is pressurized to a high level, such as ranging from 3000 to 4500 pounds per square inch (psi) or any other suitable level. The cylinder 14 has a discharge outlet 14A at one end thereof for releasing pressurized air therefrom. The cooling device 16 can be the type incorporating thermoelectric chips (TEC) whose mode of operation requires the input of electrical power, such as from batteries, as is well-known to those of ordinary skill in the art. The breathing mask 18 can be of any suitable type.

The electrical power supply arrangement 10 of the present invention basically includes a first supplying means 20 for supplying a flow of pressurized air at a first pressure higher than atmospheric pressure, a second supplying means 22 for supplying the flow of pressurized air at substantially atmospheric pressure to the electrically-operated cooling device 16 of the breathing apparatus 12, an air flow transmission line 24 extending between and interconnecting the first supplying means 20 and the second supplying means 22 for routing the flow of pressurized air from the first supplying means 20 to the second supplying means 22, and a turbine-generator assembly 26 interposed in the air flow transmission line 24 for receiving the flow of pressurized air at the first pressure from the first supplying means 20 and discharging the flow of pressurized air at a second pressure lower than the first pressure but higher than atmospheric pressure to the second supplying means 22. The turbine-generator assembly 26, in response to expansion of the flow of pressurized air from the first pressure to the second pressure, produces a supply of electrical power to the cooling device 16 for operating the cooling device 16 of the breathing apparatus 12 to supply breathable air to the breathing mask 18.

The first supplying means 20 is a first stage pressure regulator 28 for receiving the flow of pressurized air from a source of pressurized air, such as the cylinder 14, and for reducing the pressure of the pressurized air to the first pressure. The first stage pressure regulator 28 is connected to the cylinder 14 in flow communication with the discharge outlet 14A of the cylinder 14. The first stage pressure regulator 28 reduces the air pressure from the aforesaid pressure in the cylinder 14 to a substantially reduced intermediate level, such as about 135 psi or any other suitable level. The second supplying means 22 is a second stage pressure regulator 30 for receiving the flow of pressurized air at the second pressure and for reducing the pressure of pressurized air to substantially atmospheric pressure for supplying the flow of pressurized air to the cooling device 16 of the breathing apparatus 12. The second stage pressure regulator 30 is connected to the cooling device 16.

The air flow transmission line 24 is an air hose generally comprised of a substantially flexible and gas impermeable material but can be made of any other suitable material. The hose 24 extends between and is connected to the first and second stage pressure regulators 28, 30. The hose 24 has first and second hose sections 24A, 24B. The first hose section 24A extends between and is connected to the first stage pressure regulator 28 at one end and to the turbine-generator assembly 26 at the opposite end. The first hose section 24A carries the flow of pressurized air at the first pressure. The second hose section 24B extends between and is connected to the turbine-generator assembly 26 at one end and to the second stage pressure regulator 30 at the opposite end. The second hose section 24B carries the flow of pressurized air at the second pressure.

Referring now to FIGS. 1 to 4, in accordance with the principles of the present invention, the air pressure-driven turbine-generator assembly, generally designated 26, is incorporated by the electrical power supply arrangement 10. The turbine-generator assembly 26 basically includes an air turbine 32 for receiving the flow of pressurized air and, in response thereto, producing mechanical rotary motion, and an electrical generator 34 for receiving the mechanical rotary motion and, in response thereto, producing a supply of electrical power for operating the cooling device 16 of the breathing apparatus 12. The air turbine 32 and electrical generator 34 are disposed and coupled in tandem relationship to one another. The air turbine 32 and electrical generator 34 are particularly coupled to one another by a coupler 36 or any other suitable means. The turbine-generator assembly 26 further includes an elongated hollow housing 38 which encloses and rotatably mounts the air turbine 32 and electrical generator 34, and an electrical terminal block 40 attached to the housing 38 and provides a means for accessing electrical power generated by the turbine-generator assembly 26. The housing 38 is vented and more particularly has an inlet port 38A and an outlet port 38B. An end of the first hose section 24A of the hose 24 is connected to the inlet port 38A. An end of the second hose section 24B of the hose 24 is connected to the outlet port 38B. The first and second hose section 24A, 24B of the hose 24 are connected to the inlet and outlet ports 38A, 38B, respectively, of the housing 38 of the turbine-generator assembly 26 by conventional quick-disconnect members 42, which may be utilized to quickly attach or remove the turbine-generator assembly 26 from the breathing apparatus 12, or by any other suitable means. The electrical terminal block 40 is more particularly attached to an exterior surface of the housing 38 but can be attached to any other suitable location on the housing 38. The electrical terminal block 40 has a pair of wires 40A, 40B which provide an interface to the power generated by the electrical generator 34.

The air turbine 32 of the turbine-generator assembly 26 has a rotatable central shaft 44 and a plurality of blades 46 integrally attached to and extending radially outwardly from the central shaft 44. The central shaft 44 is rotatable upon receiving the flow of pressurized air. The electrical generator 34 of the turbine-generator assembly 26 has a rotatable central rotor 48 and a stator 50 surrounding the central rotor 48 and stationarily mounted to the housing 38. The central rotor 48 of the electrical generator 34 is connected to the central shaft 44 of the air turbine 32 by the coupler 36 so as to be rotatably driven by the central shaft 44 for generating electrical power in the stator 50 of the electrical generator 34. Expansion of the flow of pressurized air from the first pressure to the second pressure across the blades 46 causes rotation of the central shaft 44 of the air turbine 32 and, in turn, rotation of the central rotor 48 of the electrical generator 34. This rotation of the central rotor 48 results in the generation of electrical power in the stator 50 of the electrical generator 34 which is accessible at the wires 40A, 40B of the terminal block 40.

The breathing apparatus 12 including the electrical power supply arrangement 10 having the turbine-generator assembly 26 is worn by a user of the SCBA. Although the electrical power supply arrangement 10 has been presented as a power supply for a breathing apparatus 12 to be used in firefighting and the like, the breathing arrangement 10 may also be used as part of a self-contained underwater breathing apparatus (SCUBA) or in environmental remediation and/or hazardous material applications which require breathing protection.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A breathing apparatus, comprising:
   (a) a breathing mask;
   (b) an electrically-operated air cooling device for supplying breathable air to said breathing mask substantially at atmospheric pressure;
   (c) first means for supplying a flow of pressurized air at a first pressure higher than atmospheric pressure;
   (d) second means for supplying the flow of pressurized air at substantially atmospheric pressure to said cooling device;
   (e) an air flow transmission line extending between and interconnecting said first supplying means and said second supplying means for routing the flow of pressurized air from said first supplying means to said second supplying means; and
   (f) a turbine-generator assembly interposed in said air flow transmission line for receiving the flow of pressurized air at the first pressure from said first supplying means and discharging the flow of pressurized air at a second pressure lower than the first pressure but higher than atmospheric pressure to said second supplying means, said turbine-generator assembly, in response to expansion of the flow of pressurized air received from said first supplying means that reduces the pressurized air from the first pressure to the second pressure, being operable to produce a supply of electrical power to said cooling device for operating said cooling device to supply the breathable air to said breathing mask.

2. The arrangement of claim 1 wherein said first supplying means is a first stage pressure regulator for receiving a flow of pressurized air from a source of pressurized air at a pressure higher than the first pressure and for reducing the pressure of the pressurized air to the first pressure.

3. The arrangement of claim 1 wherein said second supplying means is a second stage pressure regulator for receiving the flow of pressurized air at the second pressure from the turbine-generator assembly and for reducing the pressure of the pressurized air to substantially atmospheric pressure.

4. The arrangement of claim 1 wherein said turbine-generator assembly includes:
   an air turbine for receiving the flow of pressurized air from the first supplying means and in response thereto producing mechanical rotary motion; and
   an electrical generator for receiving said mechanical rotary motion and in response thereto producing said supply of electrical power for operating the cooling device of the breathing apparatus.

5. The arrangement of claim 4 wherein said turbine-generator assembly further includes an elongated hollow housing enclosing and rotatably supporting said air turbine and said electrical generator.

6. The arrangement of claim 5 wherein said turbine-generator assembly further includes an electrical terminal block attached to said housing and providing a means for accessing electrical power generated by said turbine-generator assembly.

7. The arrangement of claim 4 wherein said air turbine and said electrical generator of said turbine-generator assembly are disposed and coupled in tandem relationship to one another.

8. The arrangement of claim 7 wherein said air turbine of said turbine-generator assembly has a rotatable central shaft and a plurality of blades attached to and extending radially outwardly from said rotatable central shaft, said rotatable central shaft being rotatable upon receiving the flow of pressurized air against said blades.

9. The arrangement of claim 8 wherein said electrical generator of said turbine-generator assembly has a rotatable central rotor and a stationarily-disposed stator surrounding said rotatable central rotor, said rotatable central rotor being coupled to and rotatably driven by said rotatable central shaft of said air turbine for generating electrical power in said stator of said electrical generator.

10. A breathing apparatus, comprising:
   (a) a breathing mask;
   (b) an electrically-operated air cooling device for supplying breathable air to said breathing mask substantially at atmospheric pressure;
   (c) first means for supplying a flow of pressurized air at a first pressure higher than atmospheric pressure;
   (d) second means for supplying the flow of pressurized air at substantially atmospheric pressure to said cooling device;
   (e) an air flow transmission line extending between and interconnecting said first supplying means and said second supplying means for routing the flow of pressurized air from said first supplying means to said second supplying means; and
   (f) a turbine-generator assembly interposed in said air flow transmission line for receiving the flow of pressurized air at the first pressure from said first supplying means and discharging the flow of pressurized air at a second pressure lower than the first pressure but higher than atmospheric pressure to said second supplying means, said turbine-generator assembly including
      (i) an air turbine for receiving the flow of pressurized air and, in response thereto, producing mechanical rotary motion,
      (ii) an electrical generator coupled to said air turbine for receiving said mechanical rotary motion and, in response thereto, producing a supply of electrical power to said cooling device for operating said cooling device to supply the breathable air to said breathing mask, and (iii) an elongated hollow housing enclosing and rotatably supporting said air turbine and said electrical generator.

11. The arrangement of claim 10 wherein said first supplying means is a first stage pressure regulator for receiving a flow of pressurized air from a source of pressurized air at a pressure higher than the first pressure and for reducing the pressure of the pressurized air to the first pressure.

12. The arrangement of claim 10 wherein said second supplying means is a second stage pressure regulator for receiving the flow of pressurized air at the second pressure from the turbine-generator assembly and for reducing the pressure of the pressurized air to substantially atmospheric pressure.

13. The arrangement of claim 10 wherein said turbine-generator assembly further includes an electrical terminal block attached to said housing and providing a means for accessing electrical power generated by said turbine-generator assembly.

14. The arrangement of claim 10 wherein said air turbine and said electrical generator of said turbine-generator assembly are disposed and coupled in tandem relationship to one another.

15. The arrangement of claim 10 wherein said air turbine of said turbine-generator assembly has a rotatable central shaft and a plurality of blades attached to and extending radially outwardly from said rotatable central shaft, said rotatable central shaft being rotatable upon receiving the flow of air against said blades.

16. The arrangement of claim 15 wherein said electrical generator of said turbine-generator assembly has a rotatable central rotor and a stator stationarily mounted in said housing and surrounding said rotatable central rotor, said rotatable central rotor being coupled to and rotatably driven by said rotatable central shaft of said air turbine for generating electrical power in said stator of said electrical generator.

17. A breathing apparatus, comprising:

(a) a breathing mask;

(b) an electrically-operated air cooling device for supplying breathable air to said breathing mask substantially at atmospheric pressure;

(c) a first stage pressure regulator for receiving a flow of pressurized air from a source of pressurized air at an elevated pressure and for reducing the pressure of the pressurized air to a first pressure lower than the elevated pressure but higher than atmospheric pressure and supplying the flow of pressurized air at a first pressure;

(d) a second stage pressure regulator for receiving the flow of pressurized air at a second pressure lower than the first pressure but higher than atmospheric pressure and for reducing the flow of air to substantially atmospheric pressure and supplying the flow of pressurized air at the substantially atmospheric pressure to said cooling device;

(e) an air flow transmission line extending between and interconnecting said first stage pressure regulator and said second stage pressure regulator for routing the flow of pressurized air from said first stage pressure regulator to said second stage pressure regulator; and (f) a turbine-generator assembly interposed in said air flow transmission line for receiving the flow of pressurized air at the first pressure from said first stage pressure regulator and discharging the flow of pressurized air at the second pressure to said second stage pressure regulator, said turbine-generator assembly including (i) an air turbine for receiving the flow of pressurized air and, in response thereto, producing mechanical rotary motion, and (ii) an electrical generator coupled to said air turbine for receiving said mechanical rotary motion and, in response thereto, producing a supply of electrical power to said cooling device for operating said cooling device to supply the breathable air to said breathing mask.

18. The arrangement of claim 17 wherein said turbine-generator assembly further includes an elongated hollow housing enclosing and rotatably supporting said air turbine and said electrical generator.

19. The arrangement of claim 18 wherein said turbine-generator assembly further includes an electrical terminal block attached to said housing and providing a means for accessing electrical power generated by said turbine-generator assembly.

20. The arrangement of claim 18 wherein said air turbine and said electrical generator of said turbine-generator assembly are disposed and coupled in tandem relationship to one another.

21. The arrangement of claim 20 wherein said air turbine of said turbine-generator assembly has a rotatable central shaft and a plurality of blades attached to and extending radially outwardly from said rotatable central shaft, said rotatable central shaft being rotatable upon receiving the flow of pressurized air against said blades.

22. The arrangement of claim 21 wherein said electrical generator of said turbine-generator assembly has a rotatable central rotor and a stator stationarily mounted in said housing and surrounding said rotatable central rotor, said rotatable central rotor being coupled to and rotatably driven by said rotatable central shaft of said air turbine for generating electrical power in said stator of said electrical generator.

\* \* \* \* \*